(12) United States Patent
Loftus et al.

(10) Patent No.: US 9,574,350 B2
(45) Date of Patent: Feb. 21, 2017

(54) SEALANT COMPOSITION FOR RELEASABLE SHINGLE

(75) Inventors: James E. Loftus, Newark, OH (US); Donn R. Vermilion, Newark, OH (US); Jason D. Guerra, Tinley Park, IL (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 86 days.

(21) Appl. No.: 12/727,470

(22) Filed: Mar. 19, 2010

(65) Prior Publication Data

US 2010/0236178 A1 Sep. 23, 2010

Related U.S. Application Data

(60) Provisional application No. 61/161,996, filed on Mar. 20, 2009, provisional application No. 61/162,111, filed on Mar. 20, 2009.

(51) Int. Cl.
*E04D 1/30* (2006.01)
*E04D 1/22* (2006.01)
(Continued)

(52) U.S. Cl.
CPC .................. *E04D 1/30* (2013.01); *B32B 1/00* (2013.01); *B32B 3/26* (2013.01); *B32B 7/12* (2013.01);
(Continued)

(58) Field of Classification Search
CPC combination set(s) only.
See application file for complete search history.

(56) References Cited

U.S. PATENT DOCUMENTS

| 81,579 A | 9/1868 | Bailey |
| 356,161 A | 1/1887 | Ricketson |

(Continued)

FOREIGN PATENT DOCUMENTS

| CA | 1207975 | 7/1986 |
| CN | 2176391 | 9/1994 |

(Continued)

OTHER PUBLICATIONS

Office Action dated Mar. 2, 2011, U.S. Appl. No. 11/997,657, filed Nov. 5, 2008.

(Continued)

*Primary Examiner* — Frank D Ducheneaux
(74) *Attorney, Agent, or Firm* — Calfee, Halter & Griswold LLP

(57) ABSTRACT

A sealant composition for roofing shingles that includes a base asphalt, a linear and/or a radial copolymer, oil, and a wax is provided. The linear copolymer has an A-B di-block or an A-B-A tri-block structure. The radial copolymer may have an $(A-B)_n$ radial structure, where n is at least 4, or a tri-block (A-B-A) radial structure having from 4 to 8 arms. Blocks A and B may individually represent (1) styrene and butadiene or (2) styrene and isoprene. The oil is a petroleum-based oil that both "softens" the asphalt and reduces the viscosity of the sealant composition. The wax may be a bis-stearamide wax. Additionally, the sealant composition may be reacted with elemental sulfur to crosslink the copolymer blend. The sealant composition seals at temperatures lower than conventional sealants and promotes the easy release of the shingle from a shingle bundle.

11 Claims, 1 Drawing Sheet

(51) Int. Cl.

| | | |
|---|---|---|
| *E04D 1/20* | (2006.01) | |
| *E04D 1/26* | (2006.01) | |
| *B32B 1/00* | (2006.01) | |
| *B32B 3/26* | (2006.01) | |
| *B32B 7/12* | (2006.01) | |
| *C08L 95/00* | (2006.01) | |
| *E04D 1/34* | (2006.01) | |
| *C08L 53/00* | (2006.01) | |
| *C08L 55/00* | (2006.01) | |

(52) U.S. Cl.
CPC ............ *C08L 95/00* (2013.01); *E04D 1/20* (2013.01); *E04D 1/22* (2013.01); *E04D 1/26* (2013.01); *E04D 1/3402* (2013.01); *B32B 2255/24* (2013.01); *B32B 2255/26* (2013.01); *B32B 2307/546* (2013.01); *B32B 2419/06* (2013.01); *C08L 53/00* (2013.01); *C08L 55/00* (2013.01); *E04D 2001/347* (2013.01); *E04D 2001/3435* (2013.01); *Y10T 428/24025* (2015.01)

(56) References Cited

U.S. PATENT DOCUMENTS

| | | | |
|---|---|---|---|
| D48,172 S | 11/1915 | DunLany | |
| 1,447,750 A | 3/1923 | Bird | |
| 1,495,070 A | 5/1924 | Finley | |
| 1,516,243 A | 11/1924 | Perry | |
| 1,549,723 A | 8/1925 | Mattison | |
| 1,565,693 A | 5/1926 | Robinson | |
| 1,583,563 A | 5/1926 | Abraham | |
| 1,597,135 A | 8/1926 | Wittenberg | |
| 1,601,731 A | 10/1926 | Flood | |
| 1,665,222 A | 4/1928 | Robinson | |
| 1,666,429 A | 4/1928 | Stolp, Jr. | |
| 1,676,351 A | 7/1928 | Robinson | |
| 1,698,891 A | 1/1929 | Overbury | |
| 1,701,926 A | 2/1929 | Kirschbraun | |
| 1,799,500 A | 4/1931 | Brophy | |
| 1,802,868 A | 4/1931 | Roscoe | |
| 1,843,370 A | 2/1932 | Overbury | |
| 1,860,899 A | 5/1932 | Denton | |
| 1,885,346 A | 11/1932 | Harshberger | |
| 1,897,139 A | 2/1933 | Overbury | |
| 1,898,989 A | 2/1933 | Harshberger | |
| 1,984,529 A | 12/1934 | Harshberger | |
| 2,058,167 A | 10/1936 | McQuade | |
| 2,161,440 A | 6/1939 | Venrick | |
| 2,490,430 A | 12/1949 | Greider et al. | |
| 2,798,006 A | 7/1957 | Oldfield et al. | |
| 2,847,948 A | 8/1958 | Truitt | |
| 3,054,222 A | 9/1962 | Buckner | |
| 3,127,701 A | 4/1964 | Jastrzemski | |
| 3,138,897 A | 6/1964 | McCorkle | |
| 3,252,257 A | 5/1966 | Price et al. | |
| 3,332,830 A * | 7/1967 | Tomlinson et al. | 428/190 |
| 3,377,762 A | 4/1968 | Chalmers | |
| 3,468,086 A | 9/1969 | Warner | |
| 3,468,092 A | 9/1969 | Chalmers | |
| 3,624,975 A | 12/1971 | Morgan et al. | |
| 3,664,081 A | 5/1972 | Martin et al. | |
| 3,813,280 A | 5/1974 | Olszyk et al. | |
| 154,334 | 8/1974 | Overbury | |
| 3,913,294 A | 10/1975 | Freiborg | |
| 4,091,135 A | 5/1978 | Tajima et al. | |
| 4,194,335 A | 3/1980 | Diamond | |
| 4,195,461 A | 4/1980 | Thiis-Evensen | |
| 4,274,243 A | 6/1981 | Corbin et al. | |
| 4,301,633 A | 11/1981 | Neumann | |
| 4,307,552 A | 12/1981 | Votte | |
| 4,333,279 A | 6/1982 | Corbin et al. | |
| D265,510 S | 7/1982 | Bedwell, Jr. | |
| 4,352,837 A | 10/1982 | Kopenhaver | |
| 4,366,197 A | 12/1982 | Hanlon et al. | |
| 4,404,783 A | 9/1983 | Freiborg | |
| 4,434,589 A | 3/1984 | Freiborg | |
| 4,439,955 A | 4/1984 | Freiborg | |
| 4,459,157 A | 7/1984 | Koons | |
| 4,527,374 A | 7/1985 | Corbin | |
| 4,580,389 A | 4/1986 | Freiborg | |
| 4,637,191 A | 1/1987 | Smith | |
| 4,672,790 A | 6/1987 | Freiborg | |
| 4,680,909 A | 7/1987 | Stewart | |
| 4,706,435 A | 11/1987 | Stewart | |
| 4,717,614 A | 1/1988 | Bondoc et al. | |
| 4,738,884 A * | 4/1988 | Algrim et al. | 428/57 |
| 4,755,545 A | 7/1988 | Lalwani | |
| 4,789,066 A | 12/1988 | Lisiecki | |
| D300,257 S | 3/1989 | Stahl | |
| 4,817,358 A | 4/1989 | Lincoln et al. | |
| 4,824,880 A | 4/1989 | Algrim et al. | |
| 4,835,929 A | 6/1989 | Bondoc et al. | |
| 4,848,057 A | 7/1989 | MacDonald et al. | |
| 4,856,251 A | 8/1989 | Buck | |
| 4,869,942 A | 9/1989 | Jennus et al. | |
| D309,027 S | 7/1990 | Noone et al. | |
| D313,278 S | 12/1990 | Noone | |
| 5,036,119 A | 7/1991 | Berggren | |
| 5,039,755 A | 8/1991 | Chamberlain et al. | |
| 5,065,553 A | 11/1991 | Magid | |
| 5,082,704 A * | 1/1992 | Higgins | C08G 18/0804 428/141 |
| 5,094,042 A | 3/1992 | Freiborg | |
| 5,181,361 A | 1/1993 | Hannah et al. | |
| 5,195,290 A | 3/1993 | Hulett | |
| 5,209,802 A | 5/1993 | Hannah et al. | |
| 5,232,530 A | 8/1993 | Malmquist et al. | |
| 5,239,802 A | 8/1993 | Robinson | |
| 5,247,771 A | 9/1993 | Poplin | |
| D340,294 S | 10/1993 | Hannah et al. | |
| 5,271,201 A | 12/1993 | Noone et al. | |
| 5,295,340 A | 3/1994 | Collins | |
| D347,900 S | 6/1994 | Stapleton | |
| 5,319,898 A | 6/1994 | Freiborg | |
| 5,365,711 A | 11/1994 | Pressutti et al. | |
| 5,369,929 A | 12/1994 | Weaver et al. | |
| 5,375,387 A | 12/1994 | Davenport | |
| 5,375,388 A | 12/1994 | Poplin | |
| 5,400,558 A | 3/1995 | Hannah et al. | |
| 5,419,941 A | 5/1995 | Noone et al. | |
| 5,426,902 A | 6/1995 | Stahl et al. | |
| 5,467,568 A | 11/1995 | Sieling | |
| 5,471,801 A * | 12/1995 | Kupczyk | E04D 1/30 52/518 |
| D366,124 S | 1/1996 | Hannah et al. | |
| 5,488,807 A | 2/1996 | Terrenzio et al. | |
| D369,421 S | 4/1996 | Kiik et al. | |
| D375,563 S | 11/1996 | Hannah et al. | |
| 5,570,556 A | 11/1996 | Wagner | |
| 5,571,596 A | 11/1996 | Johnson | |
| 5,575,876 A | 11/1996 | Noone et al. | |
| 5,577,361 A | 11/1996 | Grabek, Jr. | |
| D376,660 S | 12/1996 | Hannah et al. | |
| 5,611,186 A | 3/1997 | Weaver | |
| 5,615,523 A | 4/1997 | Wells et al. | |
| 5,624,522 A | 4/1997 | Belt et al. | |
| D379,672 S | 6/1997 | Lamb et al. | |
| 5,651,734 A | 7/1997 | Morris | |
| 5,660,014 A | 8/1997 | Stahl et al. | |
| D383,223 S | 9/1997 | Sieling et al. | |
| 5,664,385 A | 9/1997 | Koschitzky | |
| 5,666,776 A | 9/1997 | Weaver et al. | |
| 5,676,597 A | 10/1997 | Bettoli et al. | |
| 5,711,126 A | 1/1998 | Wells et al. | |
| 5,746,830 A | 5/1998 | Burton | |
| 5,795,389 A | 8/1998 | Koschitzky | |
| 5,799,459 A | 9/1998 | Covert | |
| D400,268 S | 10/1998 | Sieling et al. | |
| 5,822,943 A | 10/1998 | Frankoski et al. | |
| D400,981 S | 11/1998 | Bondoc et al. | |
| D403,087 S | 12/1998 | Sieling et al. | |
| 5,853,858 A | 12/1998 | Bondoc | |

(56) References Cited

U.S. PATENT DOCUMENTS

| | | |
|---|---|---|
| 5,860,263 A | 1/1999 | Sieling et al. |
| D406,361 S | 3/1999 | Bondoc et al. |
| 5,901,517 A | 5/1999 | Stahl et al. |
| 5,916,103 A | 6/1999 | Roberts |
| 5,939,169 A | 8/1999 | Bondoc et al. |
| 5,950,387 A | 9/1999 | Stahl et al. |
| D417,016 S | 11/1999 | Moore et al. |
| D417,513 S | 12/1999 | Blanpied |
| 6,010,589 A | 1/2000 | Stahl et al. |
| 6,014,847 A | 1/2000 | Phillips |
| 6,021,611 A | 2/2000 | Wells et al. |
| 6,038,826 A | 3/2000 | Stahl et al. |
| 6,044,608 A | 4/2000 | Stahl et al. |
| 6,070,384 A | 6/2000 | Chich |
| 6,083,592 A | 7/2000 | Chich |
| 6,105,329 A | 8/2000 | Bondoc et al. |
| RE36,858 E | 9/2000 | Pressutti et al. |
| 6,112,492 A | 9/2000 | Wells et al. |
| 6,125,602 A | 10/2000 | Freiborg et al. |
| 6,145,265 A | 11/2000 | Malarkey et al. |
| 6,148,578 A | 11/2000 | Nowacek et al. |
| 6,156,289 A | 12/2000 | Chopra |
| 6,182,400 B1 | 2/2001 | Freiborg et al. |
| 6,185,895 B1 | 2/2001 | Rettew |
| 6,190,754 B1 | 2/2001 | Bondoc et al. |
| 6,199,338 B1 | 3/2001 | Hudson, Jr. et al. |
| 6,220,329 B1 | 4/2001 | King et al. |
| 6,247,289 B1 | 6/2001 | Karpinia |
| 6,253,512 B1 | 7/2001 | Thompson et al. |
| 6,310,122 B1 * | 10/2001 | Butler et al. ............... 524/60 |
| 6,343,447 B2 | 2/2002 | Geissels et al. |
| 6,351,913 B1 | 3/2002 | Freiborg et al. |
| 6,355,132 B1 | 3/2002 | Becker et al. |
| 6,361,851 B1 | 3/2002 | Sieling et al. |
| 6,397,546 B1 | 6/2002 | Malarkey et al. |
| 6,397,556 B1 | 6/2002 | Karpinia |
| 6,401,425 B1 | 6/2002 | Frame |
| 6,426,309 B1 | 7/2002 | Miller et al. |
| 6,467,235 B2 | 10/2002 | Kalkanoglu et al. |
| 6,471,812 B1 | 10/2002 | Thompson et al. |
| D466,629 S | 12/2002 | Phillips |
| 6,487,828 B1 | 12/2002 | Phillips |
| 6,494,010 B1 | 12/2002 | Miller et al. |
| 6,510,664 B2 | 1/2003 | Kupczyk |
| 6,523,316 B2 | 2/2003 | Stahl et al. |
| 6,530,189 B2 | 3/2003 | Freshwater et al. |
| D473,326 S | 4/2003 | Phillips |
| 6,565,431 B1 | 5/2003 | Villela |
| 6,578,336 B2 | 6/2003 | Elliott |
| 6,610,147 B2 | 8/2003 | Aschenbeck |
| 6,652,909 B2 | 11/2003 | Lassiter |
| 6,679,020 B2 | 1/2004 | Becker et al. |
| 6,679,308 B2 | 1/2004 | Becker et al. |
| 6,691,489 B2 | 2/2004 | Frame |
| 6,703,120 B1 * | 3/2004 | Ko ...................... C09J 183/04 428/351 |
| 6,708,456 B2 | 3/2004 | Kiik et al. |
| 6,709,760 B2 | 3/2004 | Trumbore et al. |
| 6,709,994 B2 | 3/2004 | Miller et al. |
| 6,725,609 B2 | 4/2004 | Freiborg et al. |
| 6,758,019 B2 | 7/2004 | Kalkanoglu et al. |
| 6,759,454 B2 | 7/2004 | Stephens et al. |
| 6,790,307 B2 | 9/2004 | Elliott |
| 6,804,919 B2 | 10/2004 | Railkar |
| 6,813,866 B2 | 11/2004 | Naipawer, III |
| 6,823,637 B2 | 11/2004 | Elliott et al. |
| 6,895,724 B2 | 5/2005 | Naipawer, III |
| 6,933,037 B2 | 8/2005 | McCumber et al. |
| 6,936,329 B2 | 8/2005 | Kiik et al. |
| 6,990,779 B2 | 1/2006 | Kiik et al. |
| 7,021,468 B2 | 4/2006 | Cargile |
| 7,029,739 B2 | 4/2006 | Weinstein et al. |
| 7,037,295 B2 | 5/2006 | Tiernan et al. |
| 7,048,990 B2 | 5/2006 | Koschitzky |
| 7,070,051 B2 * | 7/2006 | Kanner et al. ............... 206/382 |
| 7,073,295 B2 | 7/2006 | Pressutti et al. |
| 7,082,724 B2 | 8/2006 | Railkar et al. |
| 7,118,794 B2 | 10/2006 | Kalkanoglu et al. |
| 7,121,055 B2 | 10/2006 | Penner |
| 7,124,548 B2 | 10/2006 | Pressutti et al. |
| 7,146,771 B2 | 12/2006 | Swann |
| 7,165,363 B2 | 1/2007 | Headrick, II et al. |
| 7,238,408 B2 | 7/2007 | Aschenbeck et al. |
| 7,267,862 B1 * | 9/2007 | Burke et al. ............... 428/212 |
| 7,282,536 B2 | 10/2007 | Handlin et al. |
| 7,556,849 B2 | 7/2009 | Thompson et al. |
| D610,720 S | 2/2010 | Elliott |
| 7,765,763 B2 | 8/2010 | Teng et al. |
| 7,781,046 B2 | 8/2010 | Kalkanoglu et al. |
| 7,805,905 B2 | 10/2010 | Rodrigues et al. |
| 7,820,237 B2 | 10/2010 | Harrington, Jr. |
| 7,836,654 B2 | 11/2010 | Belt et al. |
| D633,221 S | 2/2011 | Koch |
| D633,222 S | 2/2011 | Koch |
| 7,877,949 B1 | 2/2011 | Elliott |
| 7,909,235 B2 | 3/2011 | Holley, Jr. |
| 7,921,606 B2 | 4/2011 | Quaranta et al. |
| 8,006,457 B2 | 8/2011 | Binkley et al. |
| 8,127,514 B2 | 3/2012 | Binkley et al. |
| 8,181,413 B2 | 5/2012 | Belt et al. |
| 8,216,407 B2 | 7/2012 | Kalkanoglu et al. |
| 8,240,102 B2 | 8/2012 | Belt et al. |
| 8,266,861 B2 | 9/2012 | Koch et al. |
| 8,281,520 B2 | 10/2012 | Quaranta et al. |
| 8,281,539 B2 | 10/2012 | Kalkanoglu |
| 8,302,358 B2 | 11/2012 | Kalkanoglu |
| 8,316,608 B2 | 11/2012 | Binkley et al. |
| 8,323,440 B2 | 12/2012 | Koch et al. |
| 8,371,072 B1 | 2/2013 | Shanes et al. |
| 8,371,085 B2 | 2/2013 | Koch |
| 8,453,408 B2 | 6/2013 | Kalkanoglu et al. |
| D695,925 S | 12/2013 | Ray |
| D711,558 S | 8/2014 | Bobolts |
| D735,545 S | 8/2015 | Rampling |
| 2001/0000372 A1 | 4/2001 | Kalkanoglu et al. |
| 2001/0049002 A1 | 12/2001 | Mccumber et al. |
| 2002/0000068 A1 | 1/2002 | Freiborg et al. |
| 2002/0038531 A1 | 4/2002 | Freshwater et al. |
| 2002/0078651 A1 | 6/2002 | Freshwater et al. |
| 2002/0114913 A1 | 8/2002 | Weinstein et al. |
| 2003/0040241 A1 | 2/2003 | Kiik et al. |
| 2003/0070579 A1 * | 4/2003 | Hong et al. ............... 106/31.04 |
| 2003/0093958 A1 | 5/2003 | Freiborg et al. |
| 2003/0093963 A1 | 5/2003 | Stahl et al. |
| 2003/0124292 A1 | 7/2003 | Unterreiter |
| 2003/0138601 A1 | 7/2003 | Elliott |
| 2003/0196389 A1 | 10/2003 | Naipawer |
| 2004/0055240 A1 | 3/2004 | Kiik et al. |
| 2004/0055241 A1 | 3/2004 | Railkar |
| 2004/0079042 A1 | 4/2004 | Elliott |
| 2004/0083672 A1 | 5/2004 | Penner |
| 2004/0083673 A1 | 5/2004 | Kalkanoglu et al. |
| 2004/0083674 A1 | 5/2004 | Kalkanoglu et al. |
| 2004/0109971 A1 | 6/2004 | Weinstein et al. |
| 2004/0111996 A1 | 6/2004 | Heronome |
| 2004/0123537 A1 | 7/2004 | Elliott et al. |
| 2004/0123543 A1 | 7/2004 | Elliott et al. |
| 2004/0148874 A1 | 8/2004 | Jolitz et al. |
| 2004/0172908 A1 | 9/2004 | Swann |
| 2004/0206012 A1 * | 10/2004 | Pressutti ............... E04D 1/30 52/57 |
| 2004/0206035 A1 | 10/2004 | Kandalgaonkar |
| 2004/0258883 A1 | 12/2004 | Weaver |
| 2005/0005555 A1 | 1/2005 | Naipawar |
| 2005/0137295 A1 * | 6/2005 | Kendrick et al. ............... 524/59 |
| 2005/0193673 A1 | 9/2005 | Rodrigues et al. |
| 2005/0204675 A1 | 9/2005 | Snyder et al. |
| 2005/0210808 A1 | 9/2005 | Larson et al. |
| 2005/0235599 A1 | 10/2005 | Kalkanoglu et al. |
| 2005/0252136 A1 | 11/2005 | Hardin |
| 2006/0032174 A1 | 2/2006 | Floyd |
| 2006/0175386 A1 | 8/2006 | Holley, Jr. |
| 2006/0179767 A1 | 8/2006 | Miller et al. |
| 2006/0201094 A1 | 9/2006 | Lassiter |

(56) References Cited

U.S. PATENT DOCUMENTS

| | | |
|---|---|---|
| 2006/0265990 A1 | 11/2006 | Kalkanoglu et al. |
| 2007/0020436 A1 | 1/2007 | Teng et al. |
| 2007/0039274 A1 | 2/2007 | Harrington et al. |
| 2007/0042158 A1 | 2/2007 | Belt et al. |
| 2007/0107372 A1 | 5/2007 | Harrington, Jr. |
| 2007/0144077 A1 | 6/2007 | Quaranta et al. |
| 2007/0179220 A1* | 8/2007 | Sasagawa et al. ............... 524/59 |
| 2007/0266665 A1 | 11/2007 | Todd et al. |
| 2008/0134612 A1 | 6/2008 | Koschitzky |
| 2009/0038257 A1 | 2/2009 | Todd et al. |
| 2009/0139175 A1 | 6/2009 | Todd et al. |
| 2009/0282767 A1 | 11/2009 | Grubka |
| 2010/0077689 A1 | 4/2010 | Kalkanoglu et al. |
| 2010/0143667 A1 | 6/2010 | Collins et al. |
| 2010/0192496 A1 | 8/2010 | Koch et al. |
| 2010/0192500 A1 | 8/2010 | Koch et al. |
| 2010/0192501 A1* | 8/2010 | Koch .................. E04D 1/20 52/557 |
| 2010/0212240 A1 | 8/2010 | Grubka |
| 2010/0212246 A1 | 8/2010 | Grubka |
| 2010/0218433 A1 | 9/2010 | Quaranta et al. |
| 2010/0239807 A1 | 9/2010 | Grubka |
| 2010/0310825 A1 | 12/2010 | Kalkanoglu et al. |
| 2010/0313512 A1 | 12/2010 | Rodrigues et al. |
| 2011/0005158 A1 | 1/2011 | Kailey et al. |
| 2011/0126485 A1 | 6/2011 | Bleil et al. |
| 2011/0151170 A1 | 6/2011 | Grubka et al. |
| 2011/0209428 A1 | 9/2011 | Elliott |
| 2011/0214378 A1 | 9/2011 | Grubka |
| 2011/0319533 A1* | 12/2011 | Gauthier et al. ................ 524/71 |
| 2013/0177728 A1 | 7/2013 | Grubka et al. |

FOREIGN PATENT DOCUMENTS

| | | |
|---|---|---|
| JP | 50-002937 | 1/1975 |
| WO | WO 2005100479 A1 * | 10/2005 |
| WO | 2007/108846 | 9/2007 |
| WO | 2008/052029 | 5/2008 |
| WO | WO 2009016281 A2 * | 2/2009 |
| WO | 2010/098972 | 9/2010 |
| WO | 2011/100217 | 8/2011 |

OTHER PUBLICATIONS

Response to the Office Action dated Mar. 2, 2011, U.S. Appl. No. 11/997,657, filed Nov. 5, 2008.
Office action from U.S. Appl. No. 12/727,459 dated Jan. 19, 2012.
Interview Summary from U.S. Appl. No. 12/727,459 dated Apr. 13, 2012.
Office action from U.S. Appl. No. 12/727,459 dated May 30, 2012.
Office action from U.S. Appl. No. 12/727,459 dated Oct. 3, 2012.
Office action from U.S. Appl. No. 12/831,130 dated Feb. 29, 2012.
Office action from U.S. Appl. No. 12/831,130 dated Jun. 14, 2012.
Office action from U.S. Appl. No. 12/831,130 dated Aug. 9, 2012.
Office action from U.S. Appl. No. 13/019,028 dated Aug. 10, 2011.
Office action from U.S. Appl. No. 13/019,028 dated Jun. 21, 2012.
Office action from Chinese application No. 200680028893.4 dated Apr. 24, 2009.
Office action from Japanese Application No. 2008-525265 dated Dec. 12, 2011.
Office action from U.S. Appl. No. 13/019,028 dated Dec. 19, 2012.
International Search Report from PCT/US06/30633 dated Nov. 28, 2006.
International Search Report and Written Opinion from PCT/US07/07827 dated Aug. 29, 2007.
International Search Report and Written Opinion from PCT/US10/23541 dated Jul. 6, 2010.
International Search Report and Written Opinion from PCT/US11/023989 dated May 26, 2011.
Office action from U.S. Appl. No. 09/515,928 dated Mar. 15, 2001.
Office action from U.S. Appl. No. 09/515,928 dated Oct. 11, 2001.
Office action from U.S. Appl. No. 09/515,928 dated Jan. 2, 2002.
Advisory action from U.S. Appl. No. 09/515,928 dated Jun. 7, 2002.
Office action from U.S. Appl. No. 09/515,928 dated Sep. 16, 2004.
Advisory action from U.S. Appl. No. 09/515,928 dated Feb. 22, 2005.
Office action from U.S. Appl. No. 09/515,928 dated Dec. 2, 2005.
Office action from U.S. Appl. No. 09/515,928 dated Apr. 25, 2006.
Office action from U.S. Appl. No. 09/515,928 dated Oct. 11, 2006.
Office action from U.S. Appl. No. 09/515,928 dated Apr. 20, 2007.
Advisory action from U.S. Appl. No. 09/515,928 dated Jul. 19, 2007.
Office action from U.S. Appl. No. 09/515,928 dated Sep. 19, 2007.
Notice of Panel Decision from Pre-Appeal Brief Review from U.S. Appl. No. 09/515,928 dated Feb. 8, 2008.
Examiner's Answer from U.S. Appl. No. 09/515,928 dated Jun. 18, 2008.
Decision on Appeal from U.S. Appl. No. 09/515,928 dated Jul. 28, 2010.
Notice of Allowance from U.S. Appl. No. 09/515,928 dated Sep. 27, 2010.
Office action from U.S. Appl. No. 12/119,937 dated Apr. 14, 2010.
Office action from U.S. Appl. No. 12/119,937 dated Nov. 4, 2010.
Advisory action from U.S. Appl. No. 12/119,937 dated Jan. 19, 2011.
Office action from U.S. Appl. No. 12/119,937 dated Apr. 3, 2012.
Office action from U.S. Appl. No. 12/392,392 dated Mar. 4, 2010.
Office action from U.S. Appl. No. 12/392,392 dated Sep. 13, 2010.
Advisory Action from U.S. Appl. No. 12/392,392 dated Dec. 14, 2010.
Office action from U.S. Appl. No. 12/392,392 dated Dec. 22, 2010.
Interview Summary from U.S. Appl. No. 12/392,392 dated Feb. 3, 2011.
Office action from U.S. Appl. No. 12/392,392 dated Aug. 18, 2011.
Office action from U.S. Appl. No. 12/392,392 dated Nov. 21, 2011.
Advisory Action from U.S. Appl. No. 12/392,392 dated Feb. 27, 2012.
Office action from U.S. Appl. No. 12/392,392 dated Jun. 14, 2012.
Office action from U.S. Appl. No. 12/392,392 dated Jul. 19, 2012.
Office action from U.S. Appl. No. 12/702,457 dated Jun. 18, 2012.
Office action from U.S. Appl. No. 12/702,457 dated Jul. 20, 2012.
Office action from U.S. Appl. No. 12/717,519 dated Oct. 3, 2011.
Office action from U.S. Appl. No. 12/717,519 dated May 1, 2012.
Office action from U.S. Appl. No. 12/727,459 dated May 25, 2011.
Office action from U.S. Appl. No. 12/727,459 dated Aug. 30, 2011.
Interview Summary from U.S. Appl. No. 12/727,459 dated Dec. 28, 2011.
Office action from U.S. Appl. No. 13/344,025 dated Aug. 16, 2013.
Office action from U.S. Serial No, 13/193,864 dated Nov. 04, 2013.
Office action from U.S. Appl. No. 12/702,457, filed Nov. 21, 2013.
Office action from U.S. Appl. No. 12/702,457 dated Dec. 3, 2014.
Office action from U.S. Appl. No. 13/344,025 dated Sep. 24, 2014.
Interview Summary from U.S. Appl. No. 12/727,459 dated Aug. 19, 2014.
Interview Summary from U.S. Appl. No. 12/702,457 dated Jul. 31, 2014.
Advisory action from U.S. Appl. No. 12/703,457 dated Aug. 27, 2014.
Office action from U.S. Appl. No. 13/039,726 dated Aug. 14, 2014.
Interview Summary from U.S. Appl. No. 13/344,025 dated Jul. 30, 2014.
Interview Summary from U.S. Appl. No. 13/039,736 dated Oct. 28, 2014.
Notice of Allowance from U.S. Appl. No. 13/039,726 dated Jan. 22, 2015.
Office action from U.S. Appl. No. 12/727,459 dated Jan. 26, 2015.
Office action from U.S. Appl. No. 12/717,519 dated Dec. 12, 2014.
Office action from U.S. Appl. No. 13/039,726 dated Feb. 5, 2014.
Office action from U.S. Appl. No. 12/727,459 dated Jan. 10, 2014.
Haynes, Shellflex 3681 MSDS, Jan. 4, 1999, 5 pgs.
Office action from U.S. Appl. No. 13/344,025 dated Mar. 27, 2014.
Interview Summary from U.S. Appl. No. 12/702,457 dated Feb. 26, 2014.

(56) References Cited

OTHER PUBLICATIONS

Notice of Allowance from U.S. Appl. No. 12/717,519 dated Apr. 2, 2015.
Office action from U.S. Appl. No. 12/702,457 dated May 7, 2014.
Office action from U.S. Appl. No. 13/193,864 dated May 15, 2013.
Office action from U.S. Appl. No. 12/717,519 dated Jun. 12, 2014.
Office action from U.S. Appl. No. 13/727,459 dated Jul. 11, 2013.
Office action from U.S. Appl. No. 12/727,459 dated Jun. 6, 2014.
Office action from U.S. Appl. No. 13/344,025 dated Feb. 26, 2015.
Interview Summary from U.S. Appl. No. 12/702,457 dated Mar. 4, 2015.
Advisory Action from U.S. Appl. No. 12/727,459 dated Dec. 13, 2012.
Office action from U.S. Appl. No. 13/344,025 dated Feb. 5, 2013.
Notice of Allowance from U.S. Appl. No. 13/344,025 dated Nov. 6, 2015.
Supplemental Allowance from U.S. Appl. No. 13/344,025 dated Nov. 23, 2015.
Office action from U.S. Appl. No. 29/483,307 dated Sep. 15, 2015.
Notice of Allowance from U.S. Appl. No. 12/702,457 dated May 26, 2015.
Interview Summary from U.S. Appl. No. 13/344,025 dated May 21, 2015.
Office action from Canadian Application No. 2,697,223 dated Jan. 12, 2016.
Office action from Canadian Application No. 2,697,221 dated Feb. 2, 2016.
Office action from Canadian Application No. 2,753,250 dated Nov. 26, 2015 received in our office on Feb. 11, 2016.
Notice of Allowance from U.S. Appl. No. 29/483,307 dated Feb. 11, 2016.
Notice of Allowance from U.S. Appl. No. 14/751,334 dated Apr. 8, 2016.
Office action from Canadian Application No. 2,697,223 dated Aug. 25, 2016.
Office action from Canadian Application No. 2,753,250 dated Aug. 19, 2016.
Office action from U.S. Appl. No. 14/188,957 dated Dec. 15, 2016.

\* cited by examiner

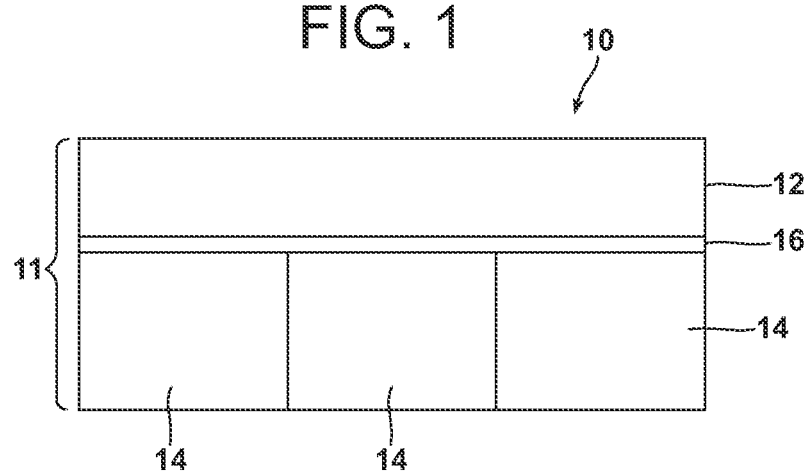
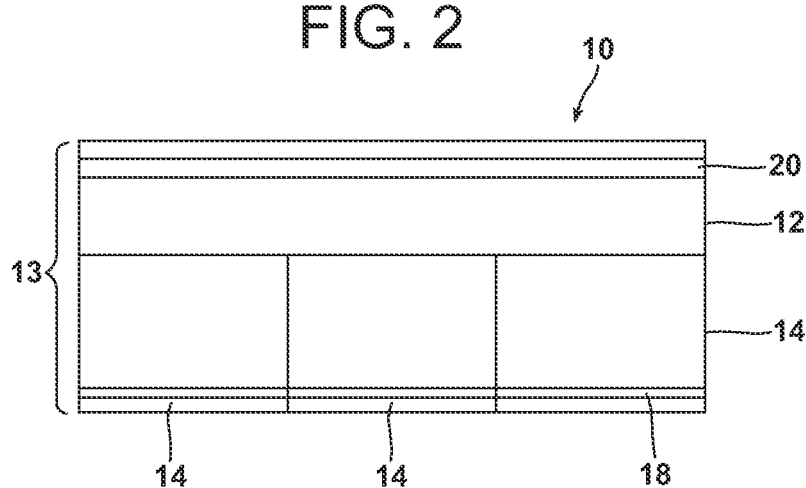
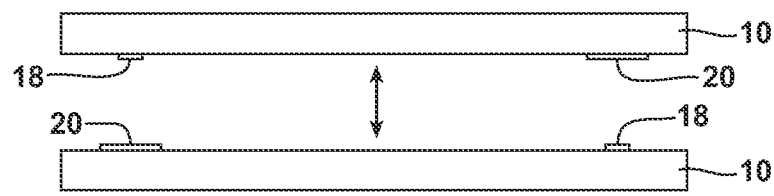

SEALANT COMPOSITION FOR RELEASABLE SHINGLE

CROSS-REFERENCE TO RELATED APPLICATIONS

This application is related to and claims domestic priority benefits from U.S. Provisional Patent Application Ser. No. 61/161,996 entitled "Low Temperature Shingle Sealant Composition" filed Mar. 20, 2009 and U.S. Provisional Patent Application Ser. No. 61/162,111 entitled "Low Temperature Shingle Sealant Composition" filed Mar. 20, 2009, the entire contents of which are expressly incorporated herein by reference in their entireties.

TECHNICAL FIELD AND INDUSTRIAL APPLICABILITY

The present invention relates generally to roofing shingles, and more particularly, to an asphaltic sealant that seals at temperatures lower than conventional sealants and that promotes the easy release of the shingle from a shingle bundle.

BACKGROUND

Asphalt-based roofing materials, such as roofing shingles, roll roofing, and built-up roofing, are installed on the roofs of buildings and residential dwellings to provide protection from the elements. The use of adhesives, including asphaltic compounds, to provide a bond between roofing shingles when they are attached to a roof is well-known. During a typical shingle manufacturing process, a pattern of adhesive is applied to the headlap portion of the shingles so that the tab portion of the subsequently laid course of shingles on the roof will adhere to the headlap portion of the lower course. This seal is to help prevent wind from uplifting the shingles.

To seal properly, most conventional sealants or adhesives require relatively high roof temperatures. Indeed, many conventional adhesives require roof temperatures of about 135° F. or higher to activate the sealant. In relatively colder climates, these roof temperatures may not be reached until seasons subsequent to installation, which conceivably could be months later. Thus, under conditions where relatively low temperatures do not permit proper sealing of the adhesive, the shingles may not be properly sealed. Another problem with conventional sealants is that colder temperatures tend to cause the sealant on the sealed shingles to become brittle and crack, resulting in bond failure.

A further problem associated with conventional sealants is that the sealant may bond the shingles together when they are in a packaged or bundled formation, such as, for example, for shipping and storing. A shingle having thereon an overly aggressive sealant will not only bond to the tab portion of the shingle when placed on a roof, it will also bond to the release tape of the adjacent shingle within the packaged shingle bundle. Such bonding may not only damage the shingle as the shingles are pried apart, it may cause frustration to the consumer trying to separate the shingles.

Although attempts have been made to address the temperature sealing problem of conventional adhesives and the over aggressiveness of the sealants, there remains a need in the art for an asphalt sealant that provides a quick and good seal at low roof temperatures, that is not overly aggressive so as to bond to the release tape in a packaged formation, that has a high bond strength to provide good resistance to shingle uplift, that does not pose any additional health or safety issues, is cost effective, and where the performance of the sealant is sustainable over time.

SUMMARY OF THE INVENTION

In some embodiments, an adhesive sealant composition that includes a base asphalt, a linear copolymer and/or a radial copolymer, an oil, and a wax is provided. The base asphalt used in the inventive sealant composition may be a viscosity graded asphalt, such as AC-10 or AC-20, or a paving graded asphalt, such as PG58 or PG64. The radial copolymer may have an $(A-B)_n$ radial structure, where n is an integer of at least 4, or a tri-block (A-B-A) radial structure having from 4-8 arms. The linear copolymer may have an A-B di-block structure or an A-B-A tri-block structure. Blocks A and B may individually represent (1) styrene and butadiene or (2) styrene and isoprene. The oil is a petroleum-based oil that both "softens" the asphalt in the composition and reduces the viscosity of the adhesive sealant composition. In some exemplary embodiments, the sealant composition also contains a wax. Such as a bis-stearamide wax. The wax may be N, N'-ethylenebis-stearamide, which is commercially available from Lonza, Inc. The inventive sealant composition maintains sufficient tack at lower temperatures to provide a good bond during installation. In addition, the sealant composition seals the shingles at roof temperatures that are lower than conventional sealants and provides good resistance to shingle uplift.

In other embodiments, roofing shingles that includes a tab portion, upper headlap portion, a release tape positioned on a rear portion of the headlap portion are provided, and a sealant composition positioned on a rear portion of the tab portion are provided. The sealant composition includes (1) a hydrocarbonaceous material, (2) a linear copolymer having an A-B di-block or an A-B-A tri-block structure and/or a radial copolymer that is selected from a block copolymer having an $(A-B)_n$ radial structure where n is an integer of at least 4 and a block copolymer having a tri-block (A-B-A) radial structure having from 4-8 arms, (3) an oil, and (4) a bis-stearamide wax. In addition, the sealant composition may contain sulfur as a crosslinking agent. The sealant provides for more flexibility at lower temperatures, such as temperatures lower than or equal to about 40° F.

In further embodiments, bundles of roofing shingles that includes a plurality of pairs of roofing shingles suitable for installing on roofs are provided. Each of the roofing shingles includes a tab portion, an upper headlap portion, a release tape positioned on a first portion of the shingle, and a sealant positioned on second portion of the shingle. The shingles in the pairs are positioned such that the sealant on a first shingle of the pair aligns with the release tape of a second shingle in the pair. In exemplary embodiments, the release tape is positioned on a rear portion of the headlap portion and the sealant composition is positioned a rear portion of the tab portion. The sealant releases the first shingle from the second shingle in said pair. The sealant composition includes (1) a hydrocarbonaceous material, (2) a linear copolymer having an A-B di-block or an A-B-A tri-block structure and/or a radial copolymer that is selected from a block copolymer having an $(A-B)_n$ radial structure where n is an integer of at least 4 and a block copolymer having a tri-block (A-B-A) radial structure having from 4-8 arms, (3) an oil, and (4) a bis-stearamide wax.

It is an advantage of the present inventions that the asphaltic sealant seals shingles at temperatures lower than conventional sealants.

It is another advantage of the present inventions that the inclusion of wax reduces high temperature aggressiveness without adversely affecting bonding performance.

It is a further advantage of the present inventions that the sealant provides for more flexibility at lower temperatures, such as temperatures lower than or equal to about 40° F.

It is also an advantage of the present inventions that the sealant improves adhesion without adversely affecting the physical and performance properties of the asphalt.

It is also an advantage of the present inventions that the sealant composition does not pose any safety or health issues to workers involved in their manufacture and/or application.

It is another advantage of the present inventions that the performance of the adhesive sealant composition is sustainable over time.

It is also an advantage of the present inventions that the asphaltic adhesive is useful in winter applications and in colder climates.

It is yet another advantage of the present inventions that the sealant has excellent bead shape retention.

The foregoing and other objects, features, and advantages of the inventions will appear more fully hereinafter from a consideration of the detailed description that follows.

BRIEF DESCRIPTION OF THE DRAWINGS

The advantages of these inventions will be apparent upon consideration of the following detailed disclosure of the invention, especially when taken in conjunction with the accompanying drawings wherein:

FIG. 1 is a schematic top plan view of a front view of a shingle suitable for use in the present invention depicting the nail strip to which the sealant adheres;

FIG. 2 is a schematic top plan view of the back side of the shingle of FIG. 1 depicting the positioning of the sealant and the release strip; and FIG. 3 is a schematic illustration of a pair of shingles used to form a stacked bundle of shingles for shipping and/or storing.

DETAILED DESCRIPTION

Unless defined otherwise, all technical and scientific terms used herein have the same meaning as commonly understood by one of ordinary skill in the art to which the invention belongs. All references cited herein, including published or corresponding U.S. or foreign patent applications, issued U.S. or foreign patents, or any other references, are each incorporated by reference in their entireties, including all data, tables, figures, and text presented in the cited references. The terms "sealant", "sealant composition", "adhesive sealant composition", "inventive sealant", "inventive sealant composition", "asphaltic sealant composition" and "roofing sealant composition" may be interchangeably used herein.

The present invention relates to an asphaltic sealant composition for roofing shingles that includes a base asphalt, a linear copolymer and/or a radial copolymer, an oil, and a wax, and optionally one or more fillers. The adhesive sealant seals at temperatures lower than conventional sealants and permits the shingle to be easily removed from a packaged bundle of shingles. The inclusion of the wax in the asphaltic sealant composition permits the release of the shingle from the release tape of the adjacent shingle in the bundle without impacting the ability of the shingle to bond to another shingle when applied to a roof. Although the sealant effectively seals at higher roof temperatures, it may be particularly useful in winter applications and in cold, northern climates. In addition, the adhesive sealant provides good resistance to shingle lift-up and flexibility at lower temperatures, such as temperatures lower than or equal to about 40° F.

The sealant contains, as one component, a base asphalt or other hydrocarbonaceous material. As used herein, the term "asphalt" is meant to include any of a variety of materials that are solid or semi-solid materials at room temperature that gradually liquefy when heated and are formed predominantly of naturally occurring bitumens obtained as residue in petroleum refining. The base asphalt used in the inventive sealant composition is desirably a viscosity graded asphalt, such as AC-10 or AC-20, or a paving graded asphalt, such as PG58 or PG64, which are commercially available from British Petroleum and Conoco Philips. The base asphalt may be generally present in the sealant composition in an amount from about 74.0% to about 90.5% by weight of the composition. In some embodiments, the base asphalt may be present in the sealant composition in an amount from about 81% to about 88% by weight of the composition. As used herein, and unless defined otherwise, the phrase "% by weight" is meant to denote % by weight of the total sealant composition.

As discussed above, the sealant composition contains a linear copolymer and/or a radial copolymer, each of which is described in detail below. The copolymers are thermoplastic and are selected for their ability to impart strength to the sealant at colder temperatures. As with conventional thermoplastic organic polymers, the copolymers used in the inventive sealant can be processed (i.e., melted and extruded) and can be repeatedly heated and cooled with no substantial loss in their properties, including elastomeric properties. Accordingly, the copolymers used herein substantially retain their properties when subjected to heating and cooling cycles. One particular advantageous feature is the ability of the copolymers to retain strength upon cooling the copolymers, which gives strength and flexibility to the sealant at colder temperatures.

The adhesive sealant composition contains a linear copolymer having an A-B di-block or an A-B-A tri-block structure. In particular, the linear copolymer has a di-block content greater than 50%. Blocks A and B may individually represent (1) styrene and butadiene or (2) styrene and isoprene. Either block, A or B, may include more than one monomer. Additionally, each block segment may include 100 or more monomer units. The linear copolymer may have a styrene content of less than 50%, or from about 20% to about 40% styrene, or from about 20% to about 35% styrene. In some exemplary embodiments, the linear copolymer has a styrene/butadiene ratio of 33/67. In some examples the linear copolymer has styrene or polystyrene as the A block or end block units. Suitable copolymers include styrene-butadiene block copolymers and styrene-isoprene block copolymers. Specific, non-limiting examples include D1118K, a styrene-butadiene-styrene di-block copolymer, and D1113K, and D1119K, styrene-isoprene-styrene linear polymers with a high-di-block content (all are commercially available from Kraton®). In some embodiments, the linear copolymer is a styrene-butadiene di-block copolymer, such as D1118K, commercially available from Kraton®. The linear di-block copolymer may be present in the inventive sealant composition in an amount from about 2.5% to about 11.0% by weight of the composition. In other embodiments, the linear copolymer is present in the sealant composition in an amount from about 2.5% to about 6.5% by weight of the composition. In some exemplary embodiments, the linear copolymer may be present in the sealant composition in a greater amount, such as, for example, from about 10-14% by weight of the composition, or from 11.0-12.0% by weight.

The radial copolymer may have an (A-B)$_n$ radial structure, where n is an integer of at least 4, or from 4-20, or a tri-block (A-B-A) radial structure having from 4-8 arms. Block copolymers are well known and are described in numerous patents, including, for example, U.S. Pat. No. 4,738,884 to Algrim, et al., U.S. Pat. No. 4,824,880 to Algrim, et al., and U.S. Pat. No. 6,759,454 to Stephens, et al., each of which is incorporated by reference in their entirety. Similar to the linear copolymer, block A and/or B in the radial copolymer may include more than one monomer and each block segment may include 100 or more monomer units. Additionally, blocks A and B may individually represent (1) styrene and butadiene or (2) styrene and isoprene. It is desirable that the radial polymer have styrene or polystyrene as the A block or end block units. The radial copolymer may have a styrene content of less than 50%, or from about 20% to about 40% styrene, or from about 20% to about 35% styrene. In some embodiments, the styrene/butadiene ratio is 31/69.

Exemplary radial copolymers include D4158K (includes 33% oil), D1184K, D1116K, and D1144K, all of which are styrene-butadiene-styrene (SBS) radial copolymers (commercially available from Kraton®), and D1124K and D1126P, both of which are styrene-isoprene radial copolymers (commercially available from Kraton®). In some embodiments, the radial copolymer is a styrene-butadiene radial copolymer, such as D4158K or D1184K (commercially available from Kraton®). The radial copolymer may be present in the adhesive sealant composition in an amount from 0% to about 9.0% by weight of the composition. In exemplary embodiments, the radial copolymer may be present in the sealant composition in an amount from about 3.5% to about 7.0% by weight of the composition.

When both a linear and a radial copolymer are present in the inventive sealant, the total amount of the radial copolymer and the linear copolymer present in the sealant composition may range from about 6.5% to about 14.0%, or from about 8.0% to about 11.0% of the total composition. Additionally, the ratio of radial copolymer to linear copolymer present in the adhesive sealant composition may range from 6:3 to 2:6 (radial copolymer:linear copolymer). In some embodiments, the ratio of radial copolymer to linear copolymer present in the sealant composition is 5:4.

Another component present in the sealant composition is an oil. The oil can be any oil recognized in the art to enhance the "softness" of the asphalt in the adhesive sealant composition. The oil also aids in reducing the viscosity of the sealant composition. In general, the oil is added in an amount necessary to achieve a desired viscosity for the sealant composition and to improve low temperature bonding. The viscosity of the sealant composition desirably does not exceed approximately 1500 cps as measured by a Brookfield LVF Viscometer using spindle number 7 at 350° F. The oil utilized in the sealant composition may be a petroleum-based oil or other naphthenic or paraffinic oils identified by one of ordinary skill in the art. One particularly useful oil is HYDROLENE SP-125 petroleum-based oil, a severely solvent modified heavy petroleum oil commercially available from Sunoco, Inc. (CAS No. 63741-88-4). The oil may be present in the adhesive sealant composition in a total amount from about 2.0% to about 7.0% of the total sealant composition, or from about 4.0% to about 6.0%. It is to be appreciated that a portion of the total oil content may be derived from another component of the sealant composition, such as, for example, an oil-containing copolymer.

A further component of the sealant composition is a wax. In some embodiments, the sealant composition is excessively aggressive at higher temperatures, such as temperatures above 110° F. It has been surprisingly and unexpectedly discovered that the addition of an ethylene bis-stearamide wax reduced high temperature aggressiveness without adversely affecting bonding performance. The wax may be a bis-stearamide wax. These waxes have a unique and surprising property of "blooming" to the surface of the sealant, such as the sealant bead. More specifically, after the sealant has been applied to the appropriate portion of the shingle and the sealant begins to cool, the wax "blooms" to the surface of the sealant bead and crystallizes, forming a waxy surface to the bead. The wax functions to reduce the overall amount of tack at the surface of the sealant. In at least one exemplary embodiment, the wax is an N, N'-ethylenebis-stearamide wax commercially available from Lonza, Inc. In exemplary embodiments, the wax may be present in an amount from about 0.2% to about 5.0% of the total composition, from about 0.50% to about 3.0%, from about 0.5% to about 3.0%, or from about 0.6% to about 2.5%, or from about 0.7% to about 0.8%. In at least one embodiment, the wax is present in an amount of about 0.75% by weight of the total composition.

In some exemplary embodiments, fillers may be added to any of the adhesive roofing sealant compositions. For example, up to about 30% by weight of a filler may be used. Suitable fillers include, but are not limited to, limestone (calcium carbonate), dolomite (calcium magnesium carbonate), wollastonite, talc, silica, and others known to those skilled in the art. The filler may have a median particle size from about 5 microns to about 50 microns, or from about 10 microns to about 30 microns.

One asphaltic adhesive roofing sealant composition is set forth in Table 1.

TABLE 1

| Components of Roofing Shingle Sealant Composition | % By Weight of Composition | Alternate % By Weight of Composition |
|---|---|---|
| PG64-22[1] | 74.0-85.8 | 79.0-83.5 |
| Kraton 1111[2] | 10.0-14.0 | 11.0-12.0 |
| Hydrolene SP-125[3] | 4.0-7.0 | 5.0-6.0 |
| Lonza EBS Wax[4] | 0.2-5.0 | 0.5-3.0 |

[1]performance grade asphalt (commercially available from British Petroleum and Conoco Philips)
[2]styrene-isoprene-styrene tri-block copolymer (commercially available from Kraton ®)
[3]petroleum-based oil (commercially available from Sunoco, Inc.)
[4]N,N'-ethylenebis-stearamide wax (commercially available from Lonza, Inc.)

A second adhesive roofing sealant composition is set forth in Table 2.

TABLE 2

| Components of Roofing Shingle Sealant Composition | % By Weight of Composition | Alternate % By Weight of Composition |
|---|---|---|
| PG58-22[1] | 74.5-88.3 | 78.0-85.5 |
| Kraton 4158[2] | 5.55-8.55 | 6.3-7.8 |
| Kraton 1118[3] | 4.6-7.6 | 5.6-7.6 |
| Hydrolene SP-125[4] | 1.35-4.35 | 2.1-3.6 |
| Lonza EBS Wax[5] | 0.2-5.0 | 0.5-3.0 |

[1]performance grade asphalt (commercially available from British Petroleum and Conoco Philips)
[2]styrene-butadiene radial copolymer containing oil (commercially available from Kraton ®)
[3]styrene-butadiene di-block copolymer (commercially available from Kraton ®)
[4]petroleum-based oil (commercially available from Sunoco, Inc.)
[5]N,N'-ethylenebis-stearamide wax (commercially available from Lonza, Inc.)

A third adhesive roofing sealant composition set forth in Table 3. The inventive sealant compositions described herein can be reacted with elemental sulfur to vulcanize in situ. Table 3 depicts an exemplary composition containing a mixture of two linear copolymers (i.e., di-block and tri-block styrene-butadiene copolymers). After dispersion in the base asphalt and oil, the copolymer blend may be cross-linked with sulfur. The addition of the sulfur to polymer modified asphalts enhances dispersion stability and improves mechanical properties.

TABLE 3

| Components of Roofing Shingle Sealant Composition | % By Weight of Composition | Alternate % By Weight of Composition |
|---|---|---|
| PG64-22[1] | 77.9-88.9 | 82.3-85.9 |
| Kraton 1101[2] | 4.0-8.0 | 6.0-7.0 |
| Kraton 1118[3] | 2.5-5.0 | 2.5-3.5 |
| Hydrolene SP-125[4] | 4.0-7.0 | 5.0-6.0 |
| Lonza EBS Wax[5] | 0.5-2.0 | 0.5-1.0 |
| Elemental sulfur | 0.1-0.3 | 0.1-0.2 |

[1]performance grade asphalt (commercially available from British Petroleum and Conoco Philips)
[2]styrene-butadiene-styrene linear tri-block copolymer (commercially available from Kraton ®)
[3]styrene-butadiene di-block copolymer (commercially available from Kraton ®)
[4]petroleum-based oil (commercially available from Sunoco, Inc.)
[5]N,N'-ethylenebis-stearamide wax (commercially available from Lonza, Inc.)

Conventional mixing or blending techniques may be used to make the sealant composition. In at least one exemplary embodiment, the base asphalt is heated to a temperature of approximately 350° F. and the oil is blended into the molten asphalt. A blend of the radial copolymer and linear copolymer is added to the molten asphalt/oil to form a mixture. The mixture is then placed into a conventional milling apparatus where the polymers are sheared into smaller polymeric pieces. The mixture is ground in the milling apparatus for a period of time sufficient to mill (grind) the polymers to a size that is no longer visible to the naked eye when viewed as a thin film. The wax may be added to the asphalt/oil mixture after the polymeric blend is milled. The sealant composition is cooled for packaging and then melted for application to a shingle. It may be desirable to circulate and maintain the adhesive at an elevated temperature during processing and application to the shingles to aid in the prevention of phase separation.

The sealant composition may be applied to any roofing shingle that is designed to be laid down in courses or layers, with at least a portion of successive layers of the shingles overlapping. The shingle may be any conventional shingle known in the art; however, more particularly suited shingles are those shingles made of glass fiber reinforced asphalt, such as, but not limited to, the shingles described in U.S. Patent Publication No. 2007/0042158 to Belt, et al. For instance, the shingle may be a granule covered roofing shingle having a lower tab portion, an upper headlap portion, a first end, and a second end. Such a shingle is suitable for installing on roofs end-to-end (or side-by-side) with similar shingles in overlapping longitudinal courses.

A non-limiting example of a shingle containing the inventive sealant composition is illustrated in FIGS. 1 and 2. The shingle 10 may include a headlap portion 12, a tab portion 14, and a nail strip 16 positioned at the interface of the headlap portion 12 and the tab portion 14. In addition, the shingle has a front side, depicted in FIG. 1 and a back side, depicted in FIG. 2. In exemplary embodiments, the sealant composition 18 is applied to the back side of the tab portion 14. The sealant 18 may be applied to the shingle in any manner, and may take the form of a strip or a plurality of beads. A release strip or tape 20 (e.g., silicone coated polyester film) is positioned on the back side of the headlap portion 12.

In use, the shingle 10 is placed on a roof (not shown) with the bottom side facing down towards the roof and is securely nailed to the roof by nailing or otherwise mechanically affixing the shingle 10 through the nail strip 16. A series of shingles 10 are placed on the roof in a horizontal manner across the roof to form a first course of shingles. A second course of shingles is then affixed to the roof by positioning these shingles over the first course of shingles such that the tab portion 14 of the shingles forming the second course overlaps the headlap portion 12 and nail strip 16 of the first course of shingles. The shingles forming the second course are then nailed to the roof though the nail strip 16 as described above. This process is repeated until the installer reaches the top of the roof. The sealant 18 adheres the tab portion 14 to the headlap portion 12 and/or the nail strip 16 of the shingle 10 in the course located directly below the shingle 10, thereby preventing "lift off" of the shingles 10 by high wind. In cases where there is an asphaltic coating to which the sealant adheres (not illustrated), the sealant also integrates into the asphaltic coating to provide a mechanical adhesion as well as an adhesion by the components forming the sealant composition.

The sealant not only seals and adheres the shingles after placement of the shingles on the roof, the sealant improves the releasability of the shingles when the shingles are stacked or placed in a bundle, such as for shipping and/or storing. The shingles 10 within the bundle are positioned in pairs of two such that the sealant 18 lines up with the release tape 20 of a previously positioned shingle, as depicted in FIG. 3. In particular, the first shingle is positioned with the top surface 11 of the shingle facing downward and the bottom surface 13 facing upward (i.e., the shingle 10 is flipped upside down). A second shingle, with the top surface 11 facing upward, is rotated 180° so that the sealant 18 of the second shingle aligns with the release tape 20 of the first shingle, and vice versa. In other words, the second shingle is oppositely oriented with respect to the first shingle to prevent unwanted bonding of the shingles to each other within the bundle. The third shingle in the stack is placed in the same orientation as the first shingle so that the top surface of the second shingle is matched against the top surface of the upside down third shingle. The fourth shingle is placed in the same orientation as the second shingle such that the sealant 18 of each of the third and fourth shingles aligns with an opposing release strip on the opposing shingle. This process is repeated until enough pairs of shingles have been positioned to form the bundle for shipping and/or storing. These "paired" shingles may then be stacked and wrapped to form the shingle bundle.

As discussed above, the sealant may be applied to the shingle in any manner, such as in a continuous strip or as a plurality of beads, dashes, other in some other discontinuous manner. The packaging or bundling of shingles having thereon conventional sealants may lead to severe sticking of the shingles inside the bundle, even in the presence of release tape. However, the inventive sealant improves the ability of a worker to release the shingle from the bundle with relative ease. The sealant functions within the package of shingles to prevent or reduce the occurrence of individual shingles adhering to each other within the bundle. Additionally, the adhesive improves flexibility and bonding, even at temperatures lower than or equal to about 40° F.

The sealant composition of the present invention provides numerous advantages, such as, for example, the ability to provide a good initial bond during installation and to seal shingles at roof temperatures that are lower than conventional sealants. It is also advantageous that the sealant composition permits the shingle to be easily removed from the packaged shingle bundle. As discussed in detail above, the wax present in the sealant composition forms a waxy surface on the sealant, which allows for a quick and easy release from the release tape of the adjacent shingle in the package of shingles. The sealant formulation provides lower sealing temperatures than traditional sealants, and maintains excellent flexibility at low temperatures. Additionally, the wax causes the sealant composition to possess excellent bead shape retention compared to identical formulations with no wax additive. Also, the sealant composition has little or no toxicity or safety issues, and, as a result, no additional safety precautions or equipment are needed to apply the sealant to a roofing shingle.

Having generally described this invention, a further understanding can be obtained by reference to certain specific examples illustrated below which are provided for purposes of illustration only and are not intended to be all inclusive or limiting unless otherwise specified.

EXAMPLE

Materials Required:
Aluminum Panel (~6"×3")
PET film (Cut into pieces 6" long)
Small (6"×6") heated press (w/1 mm shims) set @ 260° F.
Adhesive Roller (10 pound) (preheated to 140° F.)
Silicone Release Paper
Oven @ 140° F.
Refrigerator @ 40° F. (or variable down to 0° F.)
Sealant or Adhesive (both unknowns and controls)

Procedure:

20 g of molten adhesive was poured onto an 8"×8" piece of silicone release paper such that the adhesive was on one half of the paper, not in the center (so the paper can be folded in half prior to pressing). The material was allowed to cool for at least 20 minutes. Next, the paper was folded in half so that one half of the paper covered the adhesive. The folded paper was then placed into a press and pressed until the shims were contacted. The material was permitted to sit in the press for approximately 1 minute. The pressure was then released and the paper was removed.

The folded, pressed paper was placed into a refrigerator at approximately 40° F. for about 10 minutes to allow the adhesive to cool. Immediately after removing the paper from the refrigerator, the paper was cut into 4 strips having a size of 1 cm×6 cm. The release paper was then removed from the cut strips. Next, two strips were placed on an aluminum panel about 5 mm from the edge. One piece of polyethylene terephthalate (PET) film was centered over the adhesive strip such the edges of the film did not overlap the center of the panel. The panels were then placed into an oven, taking care not to remove the tape.

After 30 minutes in the oven, one panel at a time was removed along with a pre-heated 10 pound roller. The roller was manually rolled over each strip (individually four times—2 up and 2 back). This rolling process was repeated for all panels in the oven. Once the panels were pressed, the panels were all placed into the refrigerator at a pre-selected temperature for a period of not less than 12 hours and not more than 18 hours. The time for each panel was recorded. After the allotted period of time, each panel was removed and the tape was manually removed. Observations regarding the panel, tape, and releasability, as well as any other visual or physical observations of the inventive sealants, were noted and recorded.

The releasability of the panels was rated on a scale of 1 to 5 as follows:

5: The tape showed strong bond showing no adhesive or cohesive failure. PET tape could not be removed 4: The tape showed initial bonding requiring some effort to pull apart. Once bond was broken, there was evidence of cohesive failure (some adhesive left on the tape).

3: The tape showed initial bonding requiring moderate effort to pull apart. Once the bond was broken, the tape showed adhesive failure.

2: The tape showed initial bonding requiring little effort to pull apart. Once bond was broken, the tape showed adhesive failure.

1: The tape showed no initial bonding. The tape peeled off with very little effort.

The observation collected recorded are set forth in Table 5.

TABLE 5

|  | Wax Level (%) | Peel Strength |
|---|---|---|
| Control | 0 | 1 |
| Adhesive 1 | 0 | 4 |
| Adhesive 1 | 1.5 | 2 |
| Adhesive 1 | 3..0 | 1 |
| Adhesive 2 | 0 | 4.1 |
| Adhesive 2 | 0.5 | 2.8 |
| Adhesive 2 | 0.75 | 1.9 |
| Adhesive 2 | 1.25 | 2.1 |
| Adhesive 2 | 1.75 | 2.3 |
| Adhesive 2 | 2.25 | 1.8 |
| Adhesive 3 | 0 | 3.25 |
| Adhesive 3 | 0.5 | 3.0 |
| Adhesive 3 | 0.75 | 4.125 |
| Adhesive 3 | 1.25 | 3.25 |
| Adhesive 3 | 1.75 | 2.875 |
| Adhesive 3 | 2.25 | 2.0 |
| Adhesive 4 | 0 | 4.5 |
| Adhesive 4 | 0.75 | 3.8 |
| Adhesive 5 | 0 | 4.7 |
| Adhesive 5 | 0.75 | 3.0 |

The control adhesive is a standard sealant formulation that is much less aggressive compared to the inventive sealant formulation. This experiment was designed to simply describe the performance of several variations of the inventive sealant with respect to adhesion to a simple, unmodified polyester film. The temperature was lowered to allow for differentiation between sealants as well as to understand the impact of temperature on sealant flexibility. Although subjective, the experiment shows that aggressiveness toward the film can be modified substantially with addition of wax. In addition, visual inspection of the sealant strips containing the wax shows a significant reduction in glossiness of the surface as compared to the samples that did not contain wax, confirming the blooming of the wax to the surface of the adhesive strip.

The invention of this application has been described above both generically and with regard to specific embodiments. Therefore, it is to be understood that a wide variety of alternatives known to those of skill in the art can be selected within the generic disclosure.

Having thus described the invention, what is claimed is:

1. A roofing shingle comprising:
    a tab portion and an upper headlap portion, said shingle being suitable for installing on roofs;

a release tape positioned on a rear portion of said headlap portion; and a sealant composition positioned on a rear portion of said tab portion, said sealant composition including:

74.0 weight % to about 90.5 weight % of an asphalt-based material;

at least 6 weight % of a blend of at least one linear copolymer and at least one radial copolymer, wherein a ratio of radial copolymer to linear copolymer is from about 6:3 to 2:6;

2.0 weight % to about 7.0 weight % of an oil; and 0.2 weight % to about 5.0 weight % of a bis-stearamide wax, wherein said linear copolymer has an A-B di-block or an A-B-A tri-block structure;

wherein said radial copolymer is selected from a block copolymer having an $(A-B)_n$ radial structure where n is an integer of at least 4 and a block copolymer having a tri-block (A-B-A) radial structure having from 4-8 arms;

wherein said 0.2 weight % to 5.0 weight % of bis-stearamide wax reduces bonding between the sealant and the release tape;

wherein said sealant composition has a viscosity of no more than 1,500 cP at 350° F.; and wherein said sealant composition seals and bonds shingles at temperatures as low as 40° F.

2. The roofing shingle of claim 1, wherein said blend of said radial copolymer and said linear copolymer have a styrene content of less than 50% by weight.

3. The roofing shingle of claim 1, wherein said oil is selected from petroleum-based oils, naphthenic oils, paraffinic oils and combinations thereof.

4. The roofing shingle of claim 1, wherein said sealant composition reduces the occurrence of said roofing shingles adhering to each other within a packaged bundle of shingles.

5. The roofing shingle of claim 1, wherein said sealant composition further comprises sulfur as a crosslinking agent.

6. The roofing shingle of claim 1, wherein said sealant composition includes:

81 weight % to 88 weight % of the asphalt-based material;

6.5 weight % to 14 weight % of the blend of at least one linear copolymer and at least one radial copolymer, wherein the ratio of radial copolymer to linear copolymer is from about 6:3 to 2:6;

about 2.0 weight % to about 7.0 weight % of an oil; and about 0.5 weight % to about 3.0 weight % of a bis-stearamide wax.

7. A bundle of roofing shingles comprising:

a plurality of pairs of roofing shingles suitable for installing on roofs, each of said roofing shingles in said pair including:

a tab portion and an upper headlap portion;

a release tape positioned on a first portion of said shingle; and a sealant composition positioned on a second portion of said shingle, wherein said sealant composition comprises:

74.0 weight % to 90.5 weight % of an asphalt-based material;

at least 6 weight % of a blend of at least one linear copolymer and at least one radial copolymer, wherein a ratio of radial copolymer to linear copolymer is from about 6:3 to 2:6;

2.0 weight % to 7.0 weight % of an oil; and 0.2 weight % to 5.0 weight % of a bis-stearamide wax;

wherein said shingles in said pair are positioned such that said sealant on a first shingle of said pair aligns with said release tape of a second shingle in said pair;

wherein said 0.2 weight % to 5.0 weight % of bis-stearamide wax reduces bonding between the sealant and the release tape;

wherein said linear copolymer has an A-B di-block or an A-B-A tri-block structure;

wherein said radial copolymer is selected from a block copolymer having an $(A-B)_n$ radial structure where n is an integer of at least 4 and a block co s of mer having a tri-block (A-B-A) radial structure having from 4-8 arms;

wherein said sealant composition has a viscosity of no more than 1,500 cP at 350° F.; and wherein said sealant composition seals and bonds shingles at temperatures as low as 40° F.

8. The bundle of claim 7, wherein said sealant releases said first shingle in said pair from said second shingle in said pair.

9. The bundle of claim 7, wherein said release tape is positioned on a rear portion of said headlap portion.

10. The bundle of claim 9, wherein said sealant composition is positioned on a rear portion of said tab portion.

11. The bundle of claim 7, wherein said sealant composition includes from 0.5 weight % to 3.0 weight % of a bis-stearamide wax.

* * * * *